Nov. 18, 1930.  H. W. MEYER  1,782,010
FISHHOOK SPREADER AND METHOD OF MAKING THE SAME
Filed Jan. 24, 1929
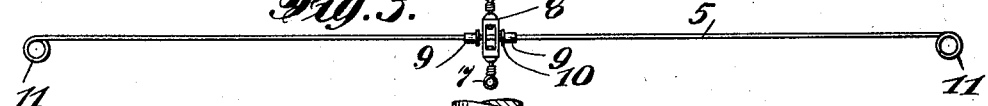
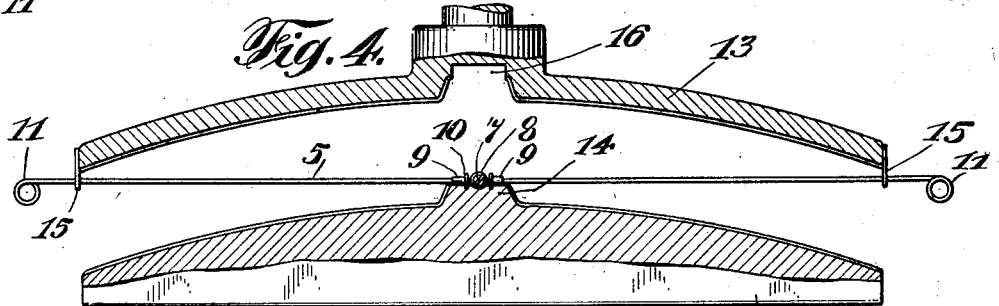
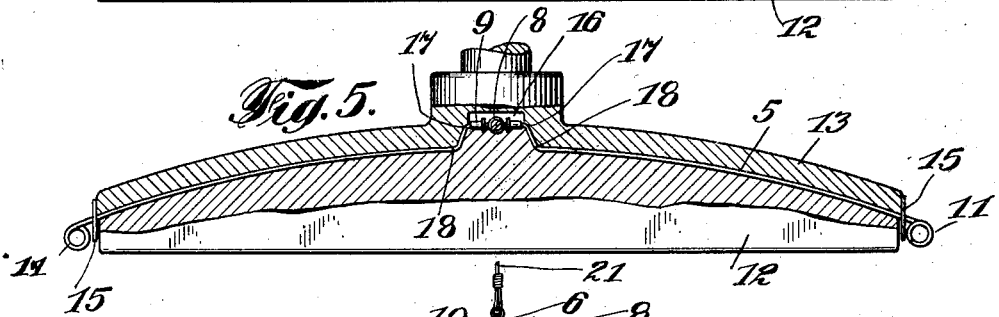
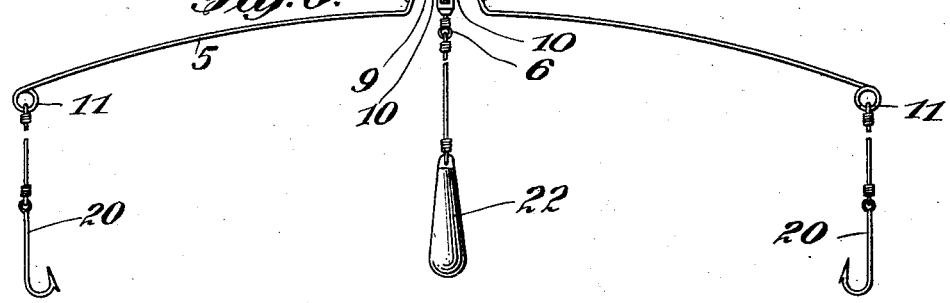
INVENTOR
H. W. Meyer
BY
his ATTORNEY Patented Nov. 18, 1930

1,782,010

UNITED STATES PATENT OFFICE

HAROLD W. MEYER, OF BROOKLYN, NEW YORK

FISHHOOK SPREADER AND METHOD OF MAKING THE SAME

Application filed January 24, 1929. Serial No. 334,627.

This invention relates to fish hook spreaders and method of making the same, the primary object and purpose of my present improvements being to expedite the quantity production of devices of this kind and greatly simplify the assemblage of the several parts whereby manufacturing costs will be materially reduced.

It is one of the important objects of the invention to provide a new method of assembling the parts of fish hook spreaders of the type having a wire provided with hook attaching eyes at its extremities and a line attaching swivel member loosely engaged on the central portion of the wire, the essentially novel step of the new method of producing such devices residing in the provision of spaced bends in the wire after the swivel member has been engaged thereon and at opposite sides thereof to prevent shifting movement of the swivel member longitudinally of the wire, retaining the same in a centered position and preserving the proper balance between the opposite ends of the wire with respect to the swivel member to which the line is attached.

It is also a further object of my invention to provide as a new article of manufacture a fish hook spreader of very simple contruction and which is provided with novel means for centering the line attaching swivel member on the spreader wire which will permit at all times of the free turning or rotative movement of said swivel member with respect to the wire and at the same time prevent any appreciable longitudinal shifting movement of said member from its centered position on the wire.

With the above and other objects in view, the invention consists in the improved fish hook spreader and the method of making the same as will be hereinafter more fully described, illustrated in the accompanying drawings and subsequently incorporated in the subjoined claims.

In the drawing, wherein I have illustrated one simple and practical embodiment of the invention, and in which similar reference characters designate corresponding parts throughout the several views,—

Figure 1 is a side elevation illustrating a suitable length of wire from which the spreader member is produced;

Fig. 2 is a similar view illustrating the first step in the assemblage of the parts;

Fig. 3 is an elevation illustrating the next step in the method of assemblage;

Fig. 4 is a sectional view through the two parts of a die showing the assembled parts of Fig. 3 arranged in proper position for the final assembling step;

Fig. 5 is a similar view showing the die closed and the central bend formed in the spreader wire whereby the parts are retained in their assembled positions, and Fig. 6 is a side elevation of the completed article.

In the manufacture of my improved fish hook spreader, the body member thereof is formed from a suitable length of wire as indicated at 5 in Fig. 1 of the drawings, preferably though not necessarily, of brass.

The line and the sinker are adapted to be connected to metal eyes indicated at 6 and 7 respectively, which are swiveled in the opposite ends of an elongated member 8 having a transverse opening therethrough of sufficient diameter to loosely receive the wire 5 so that the said member 8 may turn or rotate freely on said wire. The first step in the assemblage of the parts is to thus engage the wire 5 through the opening in the member 8 and assemble said member upon the central portion of the wire. Metal sleeves or eyelets indicated at 9 are then loosely engaged upon the wire on each side of the member 8, the ends of said sleeves which are opposed to the opposite sides of the member 8 being preferably flanged as indicated at 10.

After the parts 8 and 9 have thus been assembled upon the wire 5, the ends of the wire are coiled to provide the attaching eyes indicated at 11 for the fish hook leads. The parts are now ready for the final assembly step in the dies.

As shown in Fig. 4, the male and female die members 12 and 13 respectively, have their opposed faces suitably shaped in accordance with the desired final longitudinal curvature of the spreader wire and are properly grooved to receive said wire when the die is closed. The male die member 12 is centrally provided with a rib or protuberance indicated at 14, the upper surface of which provides a suitable seat receiving the swivel member 8 and the eyelets or sleeves 9. It will be understood that these die members may be of any suitable dimensions and may be provided with means for simultaneously operating upon a multiplicity of the spreader wires. The wire is now adusted until the eyes 11 at the ends thereof are equi-distantly spaced from the member 8 positioned upon the die member 12. The movable die member 13 is preferably provided at its opposite side edges with suitable means indicated at 15 coacting with the speader wire to prevent angular horizontal shifting movement thereof as the die is closed. The movable die member 13 is of course, centrally provided with a complementary recess indicated at 16 to receive the rib or projection 14 of the male die member 12. The opposite side faces of this recess and of the rib 14 are preferably slightly flared or inclined. Thus when the die is closed as shown in Fig. 5 of the drawings, bends indicated at 17 will be formed in the wire 5 closely adjacent to the outer ends of the sleeves or eyelets 9, and in spaced relation to these bends 17, the additional bends 18 will be simultaneously formed in said wire to thus provide the opposed converging side portions 19 of the central offset or loop which are positioned in a plane preferably parallel with the plane of the terminal eyes 11 of the wire 5.

Thus, it will be evident that the bends 17 constitute stops preventing any appreciable shifting movement of the eyelets or sleeves 9 longitudinally of the wire and maintaining substantial contact between the flanges 10 on the inner ends of these sleeves and the opposite sides of the member 8 while permitting at all times of the free rotative movement of this member on the central part of the offset loop. Thus, a properly centered relation of this member 8 between the opposite ends of the spreader wire is maintained and a proper balance preserved between the same and the fish line attached to said member.

Heretofore, it has been the practice to provide on the spreader wire at each side of the swivel member, a ring or bead and a short length of coiled wire between each bead and the side of the spreader member. This coiled wire and the bead were then fixed in place on the spreader wire by means of solder. In addition to the expense of the wire coils, such operations were more or less difficult to carry out and time consuming. By my improved method, it will be seen that the operation of centering the swivel member on the spreader wire may be very quickly performed and the use of solder is entirely dispensed with. Therefore, I am enabled to manufacture such fish hook spreaders very rapidly in large quantities and at appreciably less cost than prior art devices of this kind.

As seen in Fig. 6 of the drawings, in the use of the device, the fish hooks indicated at 20 have their leads attached to the terminal eyes 11 of the spreader wire in the usual manner, the line 21 being connected with one of the swivel eye members 6 while the sinker indicated at 22 is connected with the other of said swiveled eye members.

From the foregoing description considered in connection with the accompanying drawing, the construction and several advantages of my improved fish hook spreader and the method of making the same will be clearly and fully understood. It will be seen that I have devised a very simple and efficient method of manufacture of such articles, which also materially enhances the efficient operation and durability of the device in practical use. I have herein shown a particular form of the central bend in the spreader wire and of the spacing eyelets or sleeves 9, but it will be understood that these features as well as the other detail structural parts of the finished article are susceptible of more or less variation in form and arrangement, and I therefore, reserve the privilege of resorting to all such legitimate changes therein as may be fairly incorporated within the spirit and scope of the invention as claimed.

I claim:

1. A fish hook spreader comprising a length of wire having fish hook attaching means on its opposite ends and provided with an offset loop in the central portion thereof, a line attaching member loosely engaged upon the bight portion of said loop for free rotation thereon, and sleeves loosely engaged on the bight portion of said loop at opposite sides of said member for free rotation with or independently of said member and to prevent axial shifting of said member from its centered position with respect to the loop.

2. The method of assembling a line attaching member upon a fish hook spreader wire which consists in first loosely positioning the line attaching member together with a spacer sleeve at each side thereof upon the central portion of the wire, and then simultaneously bending the wire at spaced points at the outer ends of said sleeves to thereby permanently secure the sleeves and the line attaching member against displacement longitudinally of the wire while permitting of their free independent or conjoint rotation relative to said wire.

3. A fish hook spreader comprising a length of wire having fish hook attaching means at its opposite ends, a line attaching member having spaced parts in which the central portion of said wire is loosely engaged, an anti-friction member freely rotatable upon said wire at each side of the line attaching member, and said wire being formed with a bend therein closely adjacent to each of the anti-friction members to prevent axial shifting movement of the attaching member relative to the wire.

In testimony that I claim the foregoing as my invention, I have signed my name hereto.

HAROLD W. MEYER.